US009407170B2

(12) United States Patent
Diber et al.

(10) Patent No.: US 9,407,170 B2
(45) Date of Patent: Aug. 2, 2016

(54) DC-AC INVERTER HAVING CONTROLLED MAGNETIZATION REVERSAL OF ISOLATION TRANSFORMER CORE

(71) Applicants: Anatoly Diber, Ashkelon (IL); Grigoriy Isayevich Katsman, Needham, MA (US)

(72) Inventors: Anatoly Diber, Ashkelon (IL); Grigoriy Isayevich Katsman, Needham, MA (US)

(*) Notice: Subject to any disclaimer, the term of this patent is extended or adjusted under 35 U.S.C. 154(b) by 117 days.

(21) Appl. No.: 14/456,982

(22) Filed: Aug. 11, 2014

(65) Prior Publication Data

US 2015/0043263 A1    Feb. 12, 2015

Related U.S. Application Data

(60) Provisional application No. 61/864,581, filed on Aug. 11, 2013.

(51) Int. Cl.
*H02M 7/44* (2006.01)
*H02M 7/5387* (2007.01)
*H02M 1/40* (2007.01)

(52) U.S. Cl.
CPC ............ *H02M 7/53871* (2013.01); *H02M 1/40* (2013.01)

(58) Field of Classification Search
CPC ........................................................ H02M 7/44
See application file for complete search history.

(56) References Cited

U.S. PATENT DOCUMENTS

| 3,341,766 | A | * | 9/1967 | Rhyne, Jr. | H02M 7/53871 323/307 |
| 5,331,533 | A | * | 7/1994 | Smith | H02M 3/33576 363/131 |
| 6,064,580 | A | * | 5/2000 | Watanabe | H02M 3/33592 363/127 |
| 2008/0012680 | A1 | * | 1/2008 | Muelleman | F41B 6/006 336/212 |

OTHER PUBLICATIONS

Pressman, A. I., "Switching Power Supply Design." McGraw-Hill, ISBN 0-07-052236-7, pp. 38, 94, 101 (Nov. 1997).
Hinatek, E. R., "Design of solid-state power supplies." Van Nostrand Reinhold Company, ISBN 0-442-23429-5, pp. 449, 467 (Dec. 1981).

* cited by examiner

*Primary Examiner* — Emily P Pham
(74) *Attorney, Agent, or Firm* — SciTech Legal, P.C.; Yakov M. Korkhin, Esq.

(57) ABSTRACT

Disclosed is a power inverter which converts voltage from a DC source into high frequency rectangular alternating voltage pulses which are transferred to a load via a transformer with a ferromagnetic core having no air gap. An additional indicator winding on the transformer, which is connected to a differential circuit which in turn is connected to a control circuit, makes it possible to control the process of the reversal of the magnetization of the core. Switching on the primary winding takes place when the permeability of the transformer's core achieves its maximum. This special feature makes it possible to minimize the size of the transformer, while allowing transferring maximum energy to the load with minimum of the magnetization frequency and losses.

5 Claims, 4 Drawing Sheets

DC-AC INVERTER HAVING CONTROLLED MAGNETIZATION REVERSAL OF ISOLATION TRANSFORMER CORE

CROSS REFERENCE TO RELATED APPLICATION

This application claims priority to a U.S. provisional application Ser. No. 61/864,581 entitled "DC-AC Inverter Having Controlled Magnetization of Reversal of Isolation Transformer Core", filed on Aug. 11, 2013, which is incorporated in its entirety herein by reference.

FIELD

The present teachings relate to DC-AC inverter type power supplies containing an isolation transformer which transfers energy to a load.

BACKGROUND

The approaches described in this section could be pursued, and are not necessarily approaches that have previously been conceived or pursued. Therefore, unless otherwise indicated, it should not be assumed that any of the approaches described in this section qualify as prior art, merely by virtue of their inclusion in this section.

Generally, power supplies utilizing an isolation transformer include such known topologies as push-pull, half-bridge and full-bridge (described, for example, in Pressman, A. I., "Switching Power Supply Design." McGraw-Hill, ISBN 0-07-052236-7; and Hnatek, E. R. "Design of solid-state power supplies." Van Nostrand Reinhold Company, ISBN 0-442-23429-5).

These power supplies have a number of shortcomings, including suffering from flux imbalance, which brings to saturation the core of the transformer, leading to the power supply failure One of the known approaches to addressing the problem is by utilizing a gapping of the transformer core. Such gapping reduces mutual inductance of the transformer, requiring an increase in the number of winding turns, thus leading to an increase in the core size and resulting in reduced efficiency.

Further, in the foregoing know topologies an additional threat of core saturation is created when the temperature of the core is increasing while saturation flux density decreases, which may lead to the power supply failure. Even further, in these topologies core saturation may occur in a critical situation when input voltage exceeds nominal.

SUMMARY

This summary is provided to introduce a selection of concepts in a simplified form that are further described below in the Detailed Description. This summary is not intended to identify key features or essential features of the claimed subject matter, nor is it intended to be used as an aid in determining the scope of the claimed subject matter.

In some aspects the present teachings provide for a DC-AC inverter, such that the prior art drawbacks are eliminated. An example DC-AC inverter includes a DC voltage source connector, a load connector, a choke which has an air gap, and an isolation transformer. The isolation transformer includes a closed ferromagnetic core which has no air gap. The isolation transformer also includes at least one primary winding which is configured to reverse magnetization of the closed ferromagnetic core. The isolation transformer also includes at least one secondary winding, electrically coupled to the load connector, and an indicator winding. The choke is eclectically connected in series with a magnetizing circuit of the isolation transformer. The example DC-AC inverter further includes a switching circuit electrically coupled to the at least one primary winding. The switching circuit is configured such as to enable changing direction of a magnetizing current in the isolation transformer. The example DC-AC inverter even further includes a differential circuit. The differential circuit has an input, which is electrically coupled to the indicator winding, an output, which is electrically coupled to the switching circuit. The output is configured to transmit signals to the switching circuit. The switching circuit of the example DC-AC inverter may include two or more switches. The two or more switches are electrically coupled to the at least one primary winding such as to enable changing direction of the magnetizing current. The switching circuit may further include a control circuit which is configured to operate the plurality of switches in response to the signals from the output of the differential circuit.

In some aspects the present teachings provide for a method for providing AC power to a load. The method includes a step of providing a transformer. The transformer contains a ferromagnetic core with no air gap, a primary winding, which is configured to enable electrical coupling of the primary winding to a DC voltage source, and a secondary winding, which is configured to enable its electrical coupling to a load. The method also includes a step of providing a circuit which is responsive to magnetic permeability of the ferromagnetic core of the transformer. The method further includes a step of providing a circuit as to enable switching magnetization direction of the ferromagnetic core of the transformer when the magnetic permeability of the magnetic core reaches a maximum value. The method may further include a step of providing a choke. The choke has an air gap and is configured to be serially connecting between the DC voltage source and a magnetizing circuit of the transformer. In the method, the circuit responsive to the magnetic permeability of the ferromagnetic core of the transformer may contain an indicator winding on the transformer.

The following description and the drawings set forth in detail certain illustrative features of the one or more aspects. These features are indicative, however, of but a few of the various ways in which the principles of various aspects may be employed, and this description is intended to include such aspects and their equivalents.

BRIEF DESCRIPTION OF THE DRAWINGS

The present teachings are illustratively shown and described in reference to the accompanying drawings, in which.

DETAILED DESCRIPTION

The following detailed description includes references to the accompanying drawings, which form a part of the detailed description. The drawings show illustrations in accordance with exemplary embodiments. These exemplary embodiments, which are also referred to herein as "examples", are described in sufficient detail to enable those skilled in the art to practice the present subject matter. The embodiments can be combined, other embodiments can be utilized, or structural, logical and electrical changes can be made without departing from the spirit and scope of what is disclosed. In this document, the terms "a" and "an" are used, as is common in patent documents, to include one or more than one. In this document, the term "or" is used to refer to a nonexclusive "or", such that "A or B" includes "A but not B", "B but not A", and "A and B", unless otherwise indicated.

Figure 1:
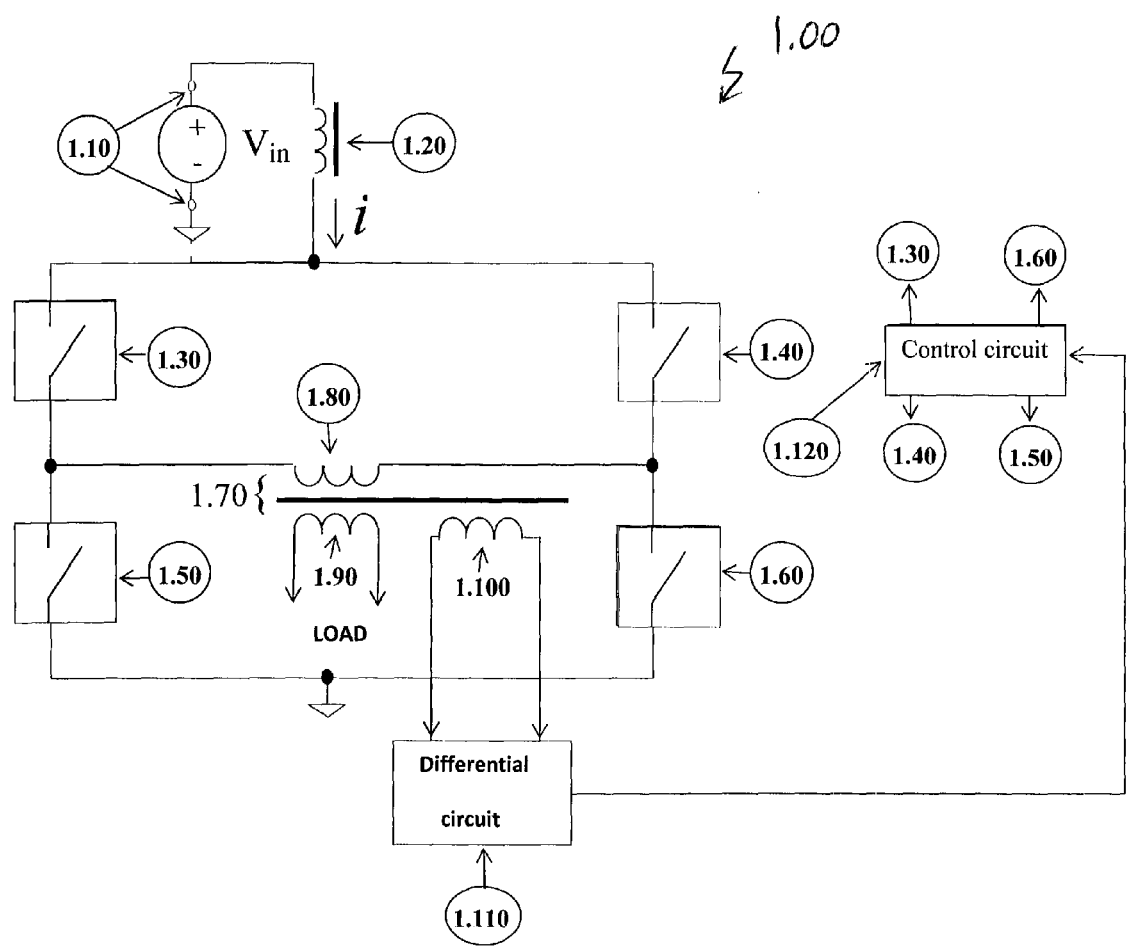
FIG. 1 shows a block diagram illustrating an example embodiment of the bridge topology.
Figure 3:
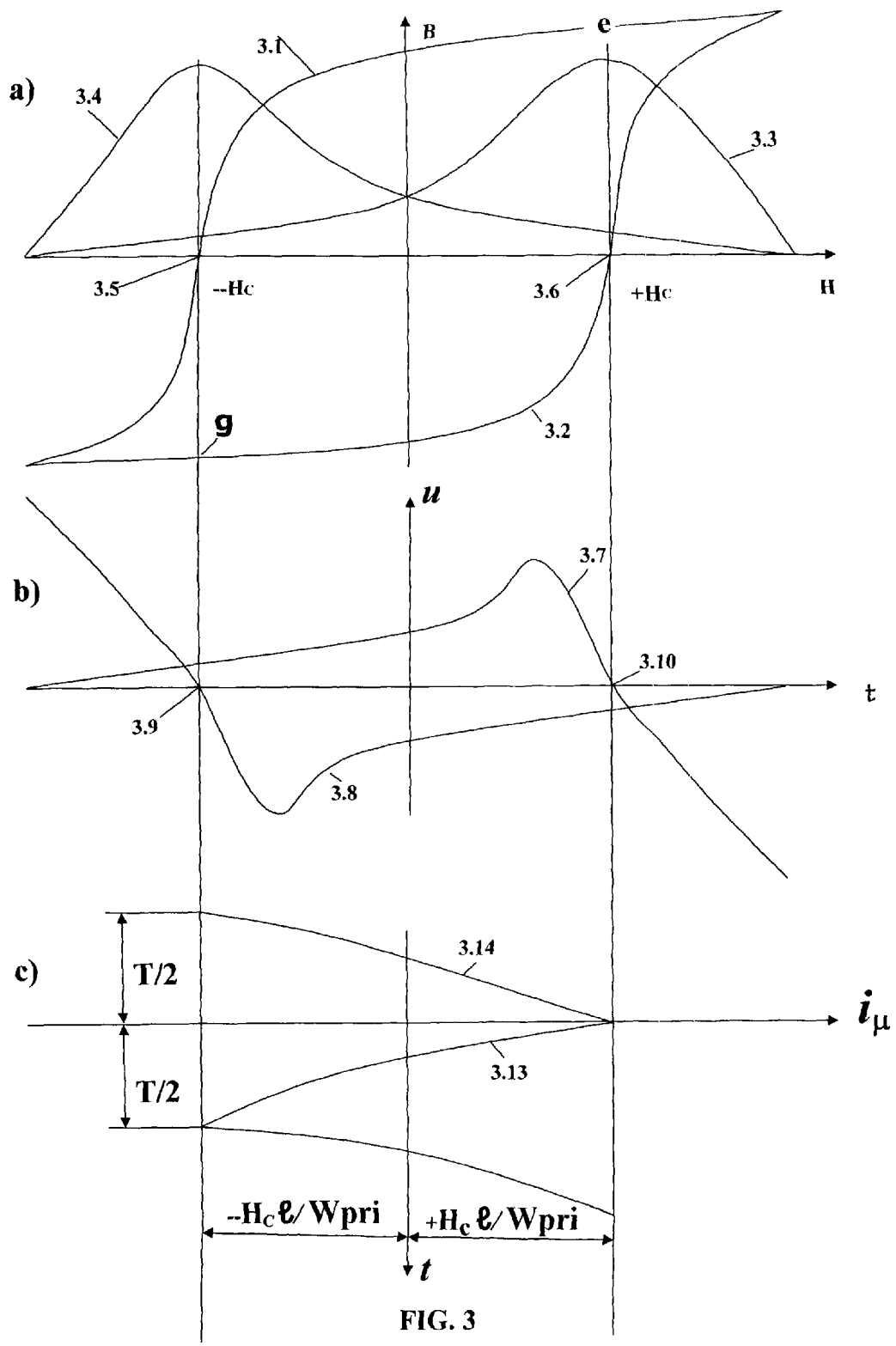
FIG. 3 shows diagrams illustrating the process of the reversal of the magnetization of the core of the inverters an example of which is shown in FIG. 1.

Referring now to the drawings, FIG. 1 shows a block diagram illustrating an example embodiment of the bridge topology of the present teachings. When direct current (DC) voltage source $V_{in}$ is connected to inverter 1.00 via voltage source connector 1.10, control circuit 1.120 operates to close switch 1.30 and switch 1.60, while keeping switch 1.50 and switch 1.40 open at this time. Magnetizing current $i_\mu$ in primary winding 1.80 ($W_{pri}$) of transformer 1.70 (transformer 1.70 core is chosen to have no air gap) begins to increase linearly (see FIG. 3, diagram c), graph numeral 3.14). Because input choke 1.20 (L), and primary winding 1.80 are connected in series, voltage on primary winding 1.80 equals:

$$U_{Wpri} = V_{in} - L_{choke} \cdot di/dt, \quad \text{Eq. 1}$$

wherein:
$U_{Wpri}$ is voltage across primary winding 1.80,
$V_{in}$ is voltage of DC voltage source 1.10,
$L_{choke}$ is the inductance value of input choke 1.20 (because input choke 1.20 is chosen with a gapped core, $L_{choke}$ is practically constant),
i is the current passing through input choke 1.20 and primary winding 1.80 of transformer 1.70.

When magnetizing current $i_\mu$ in primary winding 1.80 of transformer 1.70 reaches a value corresponding to coercive force "+$H_c$" (see FIG. 3, diagram a), position 3.6 on the rising portion of hysteresis loop 3.2), the differential permeability of the core of transformer 1.70 reaches its maximum value:

$$\mu = \mu_{max} \quad \text{Eq. 2}$$

(see FIG. 3, diagram a), graph 3.3 (Stoletov's curve)).
Magnetizing current at this point equals to:

$$i_\mu = H_c \cdot l / W_{pri}, \quad \text{Eq. 3}$$

wherein:
l is the average length of magnetic path in the core of transformer 1.70,
$W_{pri}$ is the number of turns in primary winding 1.80.
Further, at this point magnetizing inductance $L_{mag}$ in transformer 1.70 reaches its maximum:

$$L_{mag\,max} = \mu_0 \mu_{max} (W_{pri})^2 S/l, \quad \text{Eq. 4}$$

wherein:
S is cross-section area of the core of transformer 1.70,
$\mu_0$ is vacuum permeability.
Without load, maximum value of the magnetizing inductance is defined according to Eq. 4, and the average value of the magnetizing inductance equals $$L_{mag\,ave} = \mu_0 \mu_{ave} (W_{pri})^2 S/l, \quad \text{Eq. 5}$$

Wherein:
$\mu_{ave}$ is the average value of the magnetic permeability of the core of transformer 1.70.

When secondary winding 1.90 of transformer 1.70 is connected to a load, flux created by the load current, according to the Lenz law, is compensated by a corresponding flux increment that is created by the current in primary winding 1.80, thus in a steady state condition in the core of the transformer 1.70 only the flux created by the magnetizing current $i_\mu$ in effect. The maximum value of the mutual inductance $M_{max}$, between primary winding 1.80 and secondary winding 1.90, which defines the working flux in the core of transformer 1.70 equals:

$$M_{max} = \mu_0 \mu_{max} W_{pri} W_{load} S/l, \quad \text{Eq. 6}$$

wherein:
$W_{load}$ is the number of the turns in secondary winding 1.90.
The maximum value of the mutual inductance $M_{max}$ corresponds to the maximums on Stoletov's curves (see FIG. 3, diagram a), graph 3.3 and graph 3.4). That is why the averaged mutual inductance $M_{ave}$ corresponding to the process of reversal of the magnetization of the core of transformer 1.70 between points "-$H_c$" and "+$H_c$" (see FIG. 3, diagram a), positions 3.5 and 3.6) reaches its maximum too. Furthermore, power P that is transfers into the load reaches its maximum as well with any current in the load (between its minimum and maximum values):

$$P = (M_{ave} I_{load}^2 / 2)(W_{load}/W_{pri}) 2f, \quad \text{Eq. 7}$$

wherein:
$I_{load}$ is the value of the current in the load,
f is the frequency of the reversal of the magnetization of the core of transformer 1.70.

Magnetizing losses that are defined by the area "(+$H_c$)–(e)–(–$H_c$)–(g)–(+$H_c$)" (see FIG. 3, diagram a)) inside the hysteresis loop under the circumstances reach their minimum.

When magnetizing current in primary winding 1.80 is slightly above the value defined by Eq. 3, magnetic field strength in the core of transformer 1.70 is slightly above "+$H_c$". The voltage across choke 1.20, defined as ($L_{choke}$) di/dt (wherein, $L_{choke}$ is inductance of choke 1.20, i is current passing through choke 1.20 over time t), is slightly elevated. The voltage across primary winding 1.80 is slightly reduced (see Eq. 1). The voltage across indicator winding 1.100 is decreasing and the voltage at the output of differential circuit 1.110 changes its sign (see FIG. 3, diagram b), graph 3.7 below point 3.10). At that moment control circuit 1.120 opens switch 1.30 and switch 1.60, subsequently closing switch 1.40 and switch 1.50, resulting in the magnetizing process going in direction from point "+$H_c$" to the point "–$H_c$" (see FIG. 3, diagram a), subsiding part 3.1 of the hysteresis loop). Magnetizing current in primary winding 1.80 decreases (see FIG. 3, diagram c), line 3.13). Differential permeability of the core of transformer 1.70 changes (see FIG. 3, diagram a), Stoletov's curve line 3.4). At point "–$H_c$" (see FIG. 3, diagram a), point 3.5), differential permeability reaches its maximum.

When the absolute value of the magnetizing current is slightly more than:

$$i_\mu = -H_c l / W_{pri}, \quad \text{Eq. 8}$$

the absolute value of the magnetic field strength is slightly more than modulus |–$H_c$|, the voltage across choke 1.20 is slightly elevated, and the voltage across primary winding 1.80 is slightly reduced (see Eq. 1). The voltage across indicator winding 1.100 is decreasing and the voltage at the output of differential circuit 1.110 changes its sign (see FIG. 3, diagram b), graph 3.8 below point 3.9).
At that moment control circuit 1.120 opens switch 1.40 and switch 1.50, subsequently closing switch 1.30 and switch 1.60, resulting in the magnetizing process going in direction from point "-$H_c$" to the point "+$H_c$" (see FIG. 3, diagram a), rising part 3.2 of the hysteresis loop). And so on.

In the present topology, when the temperature of the core of transformer 1.70 is increasing and saturation flux density is decreasing, area "(+$H_c$)–(e)–(–$H_c$)–(g)–(+$H_c$)" (see FIG. 3, diagram a)) is also decreasing leading to decreased magnetizing losses.

According to the Faraday's law:

$$U_{wpri} = W_{pri} \Delta B \, S/(T/2), \qquad \text{Eq. 9}$$

wherein:

T is the period of the reversal of the magnetization of the core:

$$T = 1/f, \qquad \text{Eq. 10}$$

ΔB is the increment of the flux density corresponding to the increment of coercive force from "-$H_e$" to "-$H_c$".

Therefore:

$$U_{wpri} = W_{pri} \mu_0 \mu_{max} (2H_c) S/(T/2), \qquad \text{Eq. 11}$$

From Eq. 10 and Eq. 11 it follows that frequency f equals:

$$f = U_{pri}/4\mu_0 \mu_{max} W_{pri} H_c S, \qquad \text{Eq. 12}$$

and is defined by the value of $\mu_{max}$. That is to say, for the present topology, magnetizing frequency and, therefore, magnetizing losses approach their minimums.

The present topology provides for a possibility of achieving maximum physically attainable level of energy that can be received from a ferromagnetic transformer.

Figure 2:
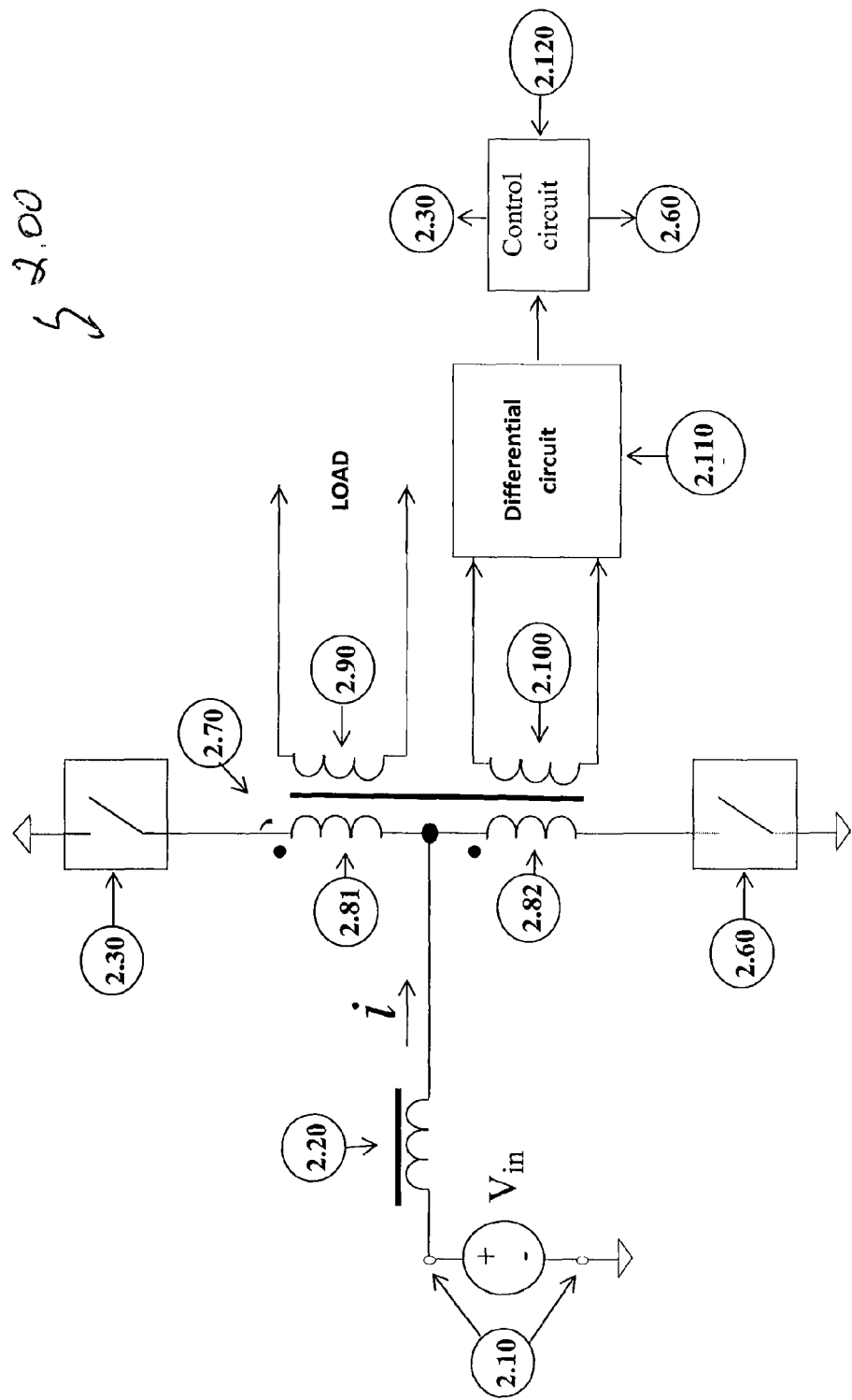
FIG. 2 shows a block diagram illustrating an example embodiment of the push-pull topology.
Figure 4:
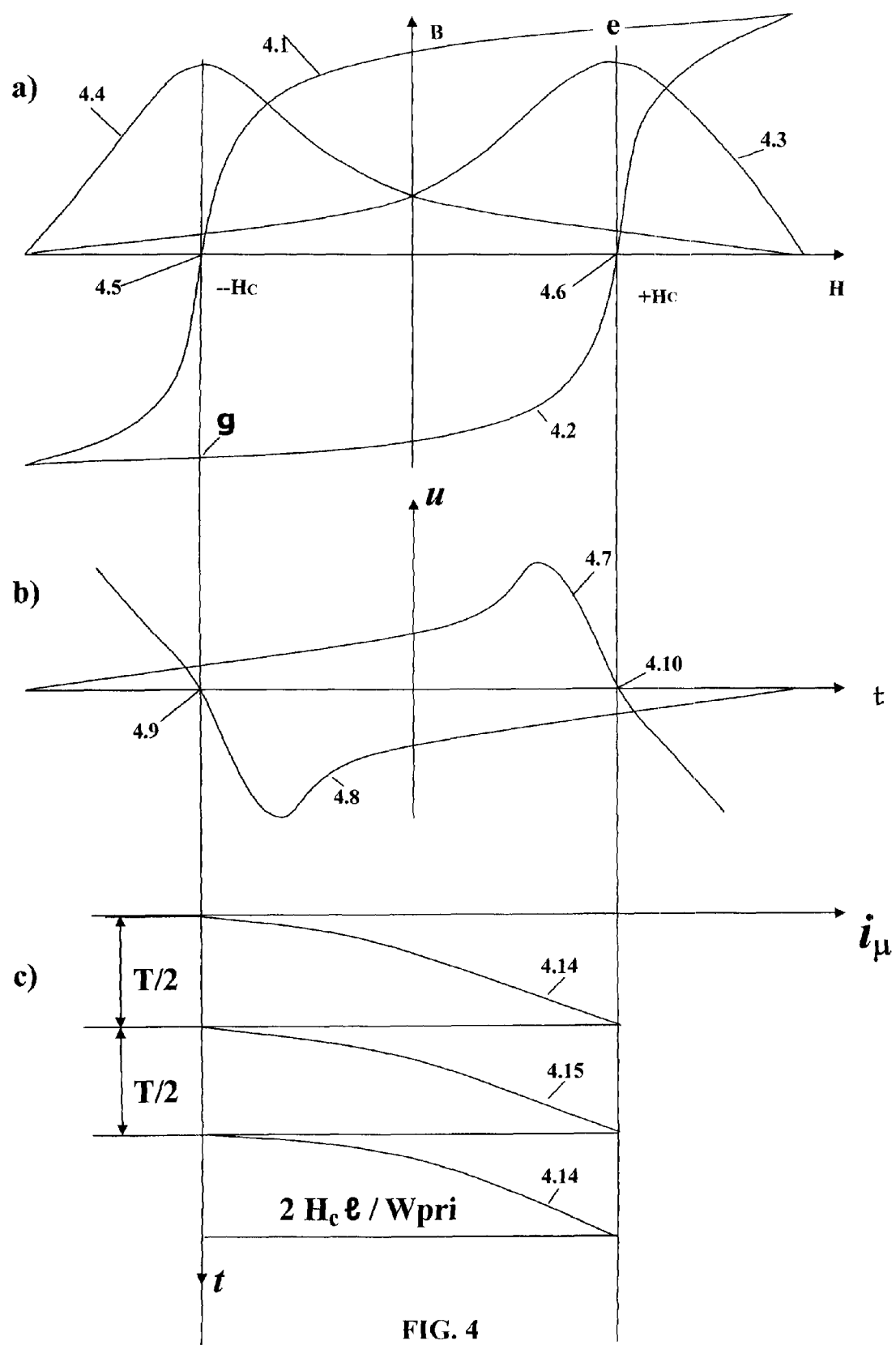
FIG. 4 shows diagrams illustrating the process of the reversal of the magnetization of the core of the inverters an example of which is shown in FIG. 2.

Referring now to FIG. 2, the figure shows a block diagram illustrating an example embodiment of the pull-pull topology of the present teachings. When DC voltage source ($V_{in}$) is connected to DC-AC inverter 2.00 via voltage source connector 2.10, control circuit 2.120 operates to close switch 2.30, while keeping switch 2.60 open. Magnetizing current in primary winding 2.81 ($W_{pri}$) of transformer 2.70 (transformer 2.70 core is chosen to have no air gap), begins increasing linearly (see FIG. 4, diagram c), graph 4.14). Because input choke 2.20 (L) and first primary winding 2.81 or second primary winding 2.82 (depending on positions of switches 2.30 and 2.60) are connected in series, voltage on the primary winding equals:

$$U_{wpri} = V_{in} - L_{choke} \cdot di/dt, \qquad \text{Eq. 1.1}$$

wherein:

$U_{wpri}$ is voltage across first primary winding 2.81, when switch 2.30 is closed and switch 2.60 is open, or voltage across second primary winding 2.82, when switch 2.30 is open and switch 2.60 is closed;

$V_{in}$ is voltage of DC voltage source at voltage source connector 2.10, $L_{choke}$ is the inductance of the input choke 2.20 (input choke 2.20 is chosen with a gapped core, therefore $L_{choke}$ is practically constant), i is current passing through in series connected input choke 2.20 and primary windings 2.81 of transformer 2.70, when switch 2.30 is closed and switch 2.60 is open, in series connected input choke 2.20 and primary winding 2.82, when switch 2.60 is closed and switch 2.30 is open.

When magnetizing current $i_\mu$ in primary winding 2.81 of transformer 2.70 reaches the value corresponding to coercive force "+$H_c$" (see FIG. 4, diagram a), position 4.6 on the rising portion of the hysteresis loop), the differential permeability of the core of transformer 2.70 reaches its maximum:

$$\mu = \mu_{max} \qquad \text{Eq. 2.1}$$

(see FIG. 4, diagram a), Stoletov's curve-graph 4.3).

At this point magnetizing current equals:

$$i_\mu = H_c l / W_{pri}, \qquad \text{Eq. 3.1}$$

wherein:

l is the average length of the magnetic path in the core of transformer 2.70, $W_{pri}$ is the number of the turns in first primary winding 2.81 or second primary winding 2.82.

At this point magnetizing inductance $L_{mag}$ of transformer 2.70 reaches its maximum:

$$L_{mag\,max} = \mu_0 \mu_{max} W_{pri}^2 S/l, \qquad \text{Eq. 4.1}$$

wherein:

S is the cross-section area of the core of transformer 1.70, $\mu_0$ is vacuum permeability.

Without load, the maximum value of the magnetizing inductance of transformer 2.70 is defined by Eq. 4.1, while the average value of the magnetizing inductance of transformer 2.70 equals:

$$L_{mag\,ave} = \mu_0 \mu_{ave} W_{pri}^2 S/l, \qquad \text{Eq. 5.1}$$

wherein:

$\mu_{ave}$ is the average value of the magnetic permeability of the core of transformer 2.70.

When a load is connected to secondary winding 2.90 of transformer 2.70, flux created by the current in the load, according to the Lenz law, is compensated by a corresponding flux increment that is created by the current in first primary winding 2.81 (or second primary winding 2.82) and, under steady state conditions in the core of transformer 2.70, only the flux created by the magnetizing current $i_\mu$ operates. The maximum value of the mutual inductance $M_{max}$ between first primary winding 2.81 (or second primary winding 2.82) and secondary 2.90, which defines the operating flux in the core of transformer 2.70 equals:

$$M_{max} = \mu_0 \mu_{max} W_{pri} W_{load} S/l, \qquad \text{Eq. 6.1}$$

wherein:

$W_{load}$ is the number of turns of secondary winding 2.90.

The above value of mutual inductance corresponds to the maximum on the Stoletov's curve (see FIG. 4, diagram a), graphs 4.3 and 4.4). That is why $M_{ave}$ which corresponds to the process of the reversal of the magnetization of the core of transformer 2.70 between points "-$H_c$" and "+$H_c$" (see FIG. 4, diagram a), positions 4.5 and 4.6) has its maximum as well. Furthermore, the power (P) which is transferred to the load also reaches a maximum under any current in the load, between minimum to maximum values:

$$P = (M_{ave} I_{load}^2/2)(W_{load}/W_{pri})^2 f, \qquad \text{Eq. 7.1}$$

wherein:

$I_{load}$ is the current in the load, f is the frequency of the reversal of the magnetization of the core of transformer 2.70.

Under the above conditions, magnetizing losses that are defined by the area "(+$H_c$)–(e)–(–$H_c$)–(g)–(+$H_c$)" inside of the hysteresis loop (see FIG. 4, diagram a)) reach their minimum.

When the magnetizing current in first primary winding 2.81 is slightly above the value defined by Eq. 3.1, magnetic field strength in the core of transformer 2.70 is slightly above "+$H_c$". The voltage across choke 2.20 ($L_{choke}$ di/dt) is slightly elevated at this moment, and the voltage across first primary winding 2.81 is slightly reduced (see Eq. 1.1). The voltage across indicator winding 2.100 at that moment is decreasing, and at the output of differential circuit 2.110 the voltage changes its sign (see FIG. 4, diagram b), graph 4.7 below point 4.10). At that moment control circuit 2.120 opens switch 2.30 and closes switch 2.60, and leading the magnetizing process to proceed in the direction from point "+H$_c$" to the point "–H$_c$" along subsiding portion 4.1 of the hysteresis loop (see FIG. 4, diagram a)). Magnetizing current in primary winding 2.82 then increases (see FIG. 4, diagram c), line 4.15). Differential permeability of the core of transformer 2.70, is changing along line 4.4 (see FIG. 4, diagram a), Stoletov's curve). At point "–H$_c$" (see FIG. 4, diagram a), position 4.5) differential permeability reaches its maximum.

When the absolute value of the magnetizing current is slightly above the value of:

$$i = -\text{Hcl}/\text{Wpri} \qquad \text{Eq. 8.1}$$

the absolute value of the magnetic field strength is slightly above the modulus |–H$_c$| and the voltage across choke 2.20 (L$_{choke}$ di/dt) is slightly elevated, the value of the voltage across second primary winding 2.82 is slightly reduced (see Eq. 1.1). The voltage across indicator winding 2.100 at that moment is decreasing and the voltage at the output of differential circuit 2.110 changes its sign (see FIG. 4, diagram b), line 4.8 below point 4.9). At that moment control circuit opens switch 2.60 and closes switch 2.30, leading the magnetizing process (see FIG. 4, diagram c), line 4.15) to proceed in the direction from point "–Hc" to the point "+Hc" along the rising portion 4.2 of the hysteresis loop (see FIG. 4, diagram a)). And so on.

The foregoing push-pull topology offers similar advantages to the bridge topology described in reference to FIG. 1.

All publications and patents mentioned herein are hereby incorporated by reference in their entirety as if each individual publication or patent was specifically and individually indicated to be incorporated by reference.

While specific embodiments of the subject matter have been discussed, the above specification is illustrative and not restrictive. Many variations will become apparent to those skilled in the art upon review of this specification and the claims below. The full scope of the invention should be determined by reference to the claims, along with their full scope of equivalents, and the specification, along with such variations.

What is claimed is:

1. A DC-AC inverter, said inverter comprising:
   a DC voltage source connector;
   a load connector;
   a choke having an air gap;
   an isolation transformer comprising
   a closed ferromagnetic core, said closed ferromagnetic core having no air gap,
   at least one primary winding configured to reverse a magnetization of said closed ferromagnetic core,
   at least one secondary winding electrically coupled to said load connector, and an indicator winding;
   wherein said choke is electrically connected in series with said at least one primary winding of said isolation transformer;
   a control circuit electrically coupled to said at least one primary winding and configured to change direction of a magnetizing current in said isolation transformer; and
   a differential circuit, having an input electrically coupled to said indicator winding, an output electrically coupled to said control circuit and configured to transmit a signal to said control circuit when differential permeability of said closed ferromagnetic core reaches a maximum value.

2. The DC-AC inverter of claim 1, wherein said control circuit further comprises
   two or more switches electrically coupled to said at least one primary winding to enable changing direction of said magnetizing current, and
   wherein said control circuit is configured to operate said two or more switches in response to said signal.

3. A method for providing AC power to a load, the method comprising:
   providing a transformer,
   said transformer comprising a ferromagnetic core with no air gap,
   at least one primary winding configured for electrically coupling to a DC voltage source, and a secondary winding configured for electrically coupling to a load;
   providing a circuit responsive to magnetic permeability of said ferromagnetic core;
   providing a circuit for reversing magnetization direction of said ferromagnetic core when said magnetic permeability reaches a maximum value.

4. The method of claim 3, further comprising:
   providing a choke configured for serially connecting between said DC voltage source and said at least one primary winding of said transformer, said choke having an air gap.

5. The method of claim 3, wherein
   said circuit responsive to said magnetic permeability comprises an indicator winding on said transformer.

* * * * *